United States Patent [19]

Van Slyke

[11] Patent Number: 5,156,686
[45] Date of Patent: Oct. 20, 1992

[54] SEPARATION OF OILS FROM SOLIDS

[75] Inventor: Donald C. Van Slyke, Brea, Calif.

[73] Assignee: Union Oil Company of California, Los Angeles, Calif.

[21] Appl. No.: 621,039

[22] Filed: Nov. 30, 1990

[51] Int. Cl.$^5$ .............................................. B08B 3/08
[52] U.S. Cl. ........................................ 134/26; 134/28; 134/40; 134/10; 252/8.551; 175/66; 175/46; 175/206; 507/138; 507/139
[58] Field of Search ................ 134/26, 28, 40, 10; 175/66, 46, 206; 252/8.515, 8.551

[56] References Cited

U.S. PATENT DOCUMENTS

| | | | |
|---|---|---|---|
| 3,860,019 | 1/1975 | Teague | 134/109 |
| 3,901,254 | 8/1975 | Stearns et al. | 134/104.4 |
| 4,040,866 | 8/1977 | Mondshine | 134/26 |
| 4,175,039 | 11/1979 | Fisher | 134/10 |
| 4,462,416 | 7/1984 | George et al. | 134/34 |
| 4,480,691 | 11/1984 | Herter et al. | 166/267 |
| 4,546,783 | 10/1985 | Lott | 134/109 |
| 4,595,422 | 6/1986 | Hill et al. | 134/19 |
| 4,599,117 | 7/1986 | Luxemburg | 134/25.1 |
| 4,645,608 | 2/1987 | Rayborn | 134/40 |
| 4,793,423 | 12/1988 | Knol | 175/66 |
| 5,032,295 | 7/1991 | Matz et al. | 252/8.511 |

FOREIGN PATENT DOCUMENTS

| | | |
|---|---|---|
| 3213279 | 5/1984 | Fed. Rep. of Germany . |
| 3213268 | 8/1984 | Fed. Rep. of Germany . |
| 2094676 | 9/1982 | United Kingdom . |

OTHER PUBLICATIONS

"Efficiency of a Single-Stage Cuttings Washer with a Mineral Oil Invert Emulsion and its Environmental Significance" by Maurice Jones et al., Society of Petroleum Engineers of AIME, SPE 12121, copyright 1983.

Primary Examiner—Theodore Morris
Assistant Examiner—Zeinab El-Arini
Attorney, Agent, or Firm—Gregory F. Wirzbicki; William M. Dooley; Shlomo R. Frieman

[57] ABSTRACT

Drill cuttings are cleaned of oil-based drilling mud and oil using a cleaning agent, such as a C6–C10 carboxylic acid, that is preferentially oil soluble at one pH and preferentially water soluble at another pH. The oily cuttings are treated with the carboxylic acid and then washed with an aqueous, alkaline washing solution, which converts the carboxylic acid to its water soluble salt and, with vigorous agitation, lifts most of the oil from the cuttings. In other embodiments, the process is used for cleaning oil-contaminated soil, sand, and gravel, and for separating the oils from the solids in oily sludges.

21 Claims, No Drawings

SEPARATION OF OILS FROM SOLIDS

FIELD OF THE INVENTION

This invention relates to the separation of oils from solids, and more particularly, to the separation of oils from particulate solids such as drill cuttings, gravel, sand, soil, and ash. The invention has application, for example, in well drilling operations, in environmental cleanup of oil spills, and in the reclamation of valuable oil from oily sludges.

INTRODUCTION

The separation of oil from solids is important in a number of fields. The need for effective methods of cleaning spilled oil and fuel from sand, gravel, and soil is urgent. In addition, drilling operations, particularly offshore operations, frequently employ oil-based drilling fluids which contaminate the drill cuttings. The disposal of drilling fluid-contaminated drill cuttings is ever more strictly regulated, and methods of cleaning the cuttings for disposal are needed. Finally, the processing of alternative energy sources such as oil shale, coal, tar sands, and the like involve the separation of produced oil from particulate solids and ash. Methods for cleanly separating oil from such solids will provide both recovery of valuable oil products and cleaning of the solids for safer disposal.

SUMMARY OF THE INVENTION

The present invention provides methods for separating oils and greases from solids. In accordance with the invention, an oil phase in contact with a solid phase is treated with a carboxylic acid that is capable of forming a solution with the oil phase and, preferably, is substantially insoluble in water. The carboxylic acid is then contacted with a reagent that converts the carboxylic acid to a water-soluble carboxylate salt and with an aqueous washing solution that washes the carboxylate salt and the oil from the solid. Preferably, the reagent is present in the washing solution, so that conversion of the organic compound to its water-soluble form and washing of the oil from the solid are accomplished in one step.

In further embodiments of the invention, the oil and the carboxylic acid are recovered from the used washing solution. In a highly preferred embodiment, oil-based drilling mud, a fluid which comprises both liquid and suspended microparticulate components, is recovered from drill cuttings substantially intact, and the carboxylic acid is recovered separately. In this embodiment, when the oil-based mud and carboxylate salt are washed from the drill cuttings, an oil mud phase spontaneously separates from an aqueous phase containing the dissolved, preferentially water-soluble carboxylate salt. The oil mud phase, because it contains suspended microparticulate solids, is heavier than the aqueous phase, and settles beneath the aqueous phase if allowed to stand. The oil mud phase is removed and can be returned to the mud pit for recycling through the well. Then, the pH of the aqueous phase is lowered to convert the carboxylate salt back to the carboxylic acid. The carboxylic acid, being substantially insoluble in the aqueous phase, separates out as a second, organic phase which can be recovered for recycling in the cleaning process of the invention.

In another embodiment, the oil and carboxylate salt form a weak emulsion in the washing solution. Lowering the pH of the washing solution converts the salt back to the carboxylic acid and breaks the emulsion. The oil and carboxylic acid separate out together as an oil phase adjacent the aqueous phase. The oil phase, which contains the carboxylic acid, can be recovered, for example by simple phase separation, and can be recycled or incorporated in the feedstock to a refinery as desired.

DETAILED DESCRIPTION OF THE INVENTION

A carboxylic acid useful as a cleansing agent for separating an oil from a solid in the practice of this invention has two desirable properties; namely, the carboxylic acid must be oil-soluble in the acid form, and it must be convertible to a preferentially water-soluble carboxylate salt. Preferably, the carboxylic acid is preferentially oil-soluble, particularly when the carboxylic acid is to be applied to and dissolved in the oil on the solid in the presence of free water. A useful carboxylic acid is soluble in a cleansing proportion in the oil which is to be separated from a solid. When the carboxylic acid is converted to the salt form, the salt acts in a manner similar to a weak emulsifier or surfactant, allowing the oil to be washed away from the solid by an aqueous washing solution.

The carboxylic acid is reversibly convertible between preferentially oil-soluble and preferentially water-soluble forms. Thus, by manipulating the pH of the aqueous washing solution, the carboxylic acid can be recovered and recycled, improving the economics of the method and minimizing the amount of waste products potentially lost to the environment. An example of a reversibly convertible cleansing agent preferred for use in the invention is n-octanoic acid, also called caprylic acid, and its salt, potassium n-octanoate.

As used herein throughout the specification and the claims, the term "preferentially oil-soluble" means more soluble in oil than in water, and the term "preferentially water-soluble" means more soluble in water than in oil. Ideally, the carboxylic acid cleansing agent is selected to have the greatest solvating and penetrating power for the particular oil being separated from the oily solids at hand, while remaining water-soluble in its salt form. As an aid in selecting carboxylic acids for use in the invention, the solubility of a candidate acid in No. 2 diesel fuel, an arbitrarily chosen representative oil, can be compared with its solubility in water, and conversely, the solubility of an alkali metal salt of the acid in water can be compared with its solubility in diesel fuel. It is desirable that the acid be more soluble in diesel fuel than in water, preferably by a ratio of at least about 10 to 1, and more preferably by a ratio of at least about 50 to 1. Conversely, it is desirable that the salt be more soluble in water than in diesel fuel, preferably by a ratio of at least about 10 to 1, and more preferably by a ratio of at least about 50 to 1. The solubility ratios are somewhat arbitrary reference points proposed in an effort to quantify what is intuitively clear to one of ordinary skill in this art; namely, that certain compounds are appreciably soluble in oil but not in water, and others are appreciably soluble in water but not in oil. It will be understood that the solubility of one compound in another is usually a matter of degree.

The carboxylic acids preferred for use as cleansing agents in the practice of this invention are those which are liquid at ambient temperatures or at any convenient temperature for using an aqueous washing solution, i.e., usually between about 0° and about 100° C. For example, drill cuttings are often hot when they emerge from a well, sometimes reaching temperatures as high as 80° to 100° C. A carboxylic acid melting at a temperature above 100° C. can also be used to clean hot drill cuttings if the aqueous washing solution is kept under pressure and maintained at a temperature at or above the melting point of the carboxylic acid. However, it is preferred to carry out the process of the invention under ambient pressure to avoid the difficulties involved in operating at elevated pressures.

As used herein throughout the specification and the claims, the term "slightly soluble in water" shall mean no more soluble in water than n-butyric acid. This specification discusses a compound or cleansing agent as being convertible between an oil-soluble form and a water-soluble form; it will be understood that this is a figure of speech, since actually two different compounds are involved, e.g., n-octanoic acid and potassium n-octanoate. However, in preferred embodiments of the invention, the two compounds are readily and reversibly interconvertible, so that it can be convenient to speak of one compound in two forms.

Although normally (i.e., under ambient conditions) liquid carboxylic acids are preferred, non-aqueous liquid solutions of normally solid and/or normally liquid carboxylic acids in suitable non-aqueous solvents can be used, i.e., solvents which also have substantial solvency for oils, and preferably solvents which are miscible with oils. Whether the carboxylic acid is normally liquid or normally solid, it must be water-soluble in its salt form.

Carboxylic acids useful in the practice of this invention are asymmetrical in molecular structure, having a substantially hydrophobic end portion in addition to the substantially hydrophilic carboxylic acid end portion, so that their salts can act in a manner similar to that of soap and detergent molecules for washing oil from solids with an aqueous washing solution. The carboxylic acids can be represented by the structural formula

wherein n is an integer of at least 1, and R is an organic radical. When the carboxylic acid has more than one carboxylic acid group per molecule, the carboxylic acid groups are preferably asymmetrically arranged so that the molecule still has a substantially hydrophobic end portion; an example is 3-carboxyoctanoic acid, in which the two carboxyl groups are closer to one end of the molecule than the other. R can be aliphatic or alicyclic, saturated or unsaturated, or aromatic, and can have inert substituents, i.e., substituents that do not interfere with the cleansing action of the carboxylic acid and do not react with the oil or solids being treated. R can have from 1 to about 40 carbon atoms, preferably at least 4 carbon atoms, and more preferably at least about 6 carbon atoms. R preferably has no more than about 20 carbon atoms, and more preferably no more than about 12 carbon atoms. Most preferably, R has from about 7 to about 11 carbon atoms. Aliphatic monocarboxylic acids are preferred, and of those, carboxylic acids free of non-hydrocarbonaceous substituents (other than the carboxyl group) are more preferred.

Specific examples of useful carboxylic acids include acetic acid, propionic acid, butyric acid, isobutyric acid, valeric acid, isovaleric acid, caproic acid, n-heptanoic acid, caprylic acid (i.e., n-octanoic acid), pelargonic acid, capric acid, palmitic acid, stearic acid, arachidic acid, n-heptadecanoic acid, oleic acid, linoleic acid, linolenic acid, arachidonic acid, undecylenic acid, lauric acid, myristic acid, behenic acid, benzoic acid, salicylic acid, bismethylene salicylic acid, cinnamic acid, pamoic acid, ortho-phthalic acid, and mixtures thereof.

The importance of the two forms of the compound with their different solubilities in oil and water can be appreciated in reference to an example of the process of the invention. Consider the cleaning of drill cuttings coated with oil-based drilling mud. The cleansing agent, in its oil-soluble form, e.g., caprylic acid, is applied to the cuttings and penetrates deeply into the layer of oily mud on the cuttings. The compound may also be viewed as a penetrating solvent, which penetrates through the oil to the solid surface beneath. Sufficient time is allowed for the cleansing agent to penetrate to the surface of the solid particles, and preferably, into any oil-filled cracks and pits. Then, the treated cuttings are contacted under vigorous agitation with the aqueous washing solution containing a reagent, e.g., potassium hydroxide, that converts the cleansing agent to its water-soluble form, potassium caprylate. The cleansing agent, now water-soluble, rinses off the solid particles, loosening and carrying away the oil mud. Because the cleansing agent, in its oil-soluble form, can penetrate to the surface of the solid particles, the particles are thoroughly cleaned of oil mud and are substantially free of residual base oil.

Now, the importance of reversible convertibility of the cleansing agent between its two forms can be seen. After separation from the cuttings by screening or the like, the wash water contains the dissolved carboxylate salt and weakly emulsified or suspended globules of the oil mud removed from the cuttings. The oil mud can be allowed to separate by gravity or, preferably, is separated from the wash water in a hydroclone. Then, a suitable reagent, e.g., hydrochloric acid, is added to the wash water to convert the carboxylate salt back to the water-insoluble carboxylic acid, which then forms a separate layer on top of the wash water. The cleansing agent is thus recovered for recycling in the process of the invention. Therefore, it is preferred that the carboxylic acid itself have little or no solubility in water, i.e., no more solubility in water than caprylic acid (n-octanoic acid). The wash water, now containing potassium chloride, can be recycled in the process of the invention.

The present invention is directed broadly to the separation of oils and oil-containing phases from solids. As used herein throughout the specification and the claims, the term "oil" means a hydrocarbon-containing material that is (a) substantially insoluble, i.e., less than 0.1 weight percent by weight of solution, in water at 20° C., and (b) appreciably soluble, i.e., more than 1 weight percent by weight of solution, in liquid caprylic acid at any temperature between the melting point and the boiling point of caprylic acid, i.e., between about 16° C. and about 238° C. Because dilute aqueous acid and alkali solutions are also employed in the process of this invention, it is preferred that an oil to be treated in accordance with this invention be substantially insoluble in such dilute aqueous acids and alkalis. Furthermore, it is preferred that the oil be soluble in liquid caprylic acid to the extent of at least about 10 weight percent, and more preferably at least about 25 weight percent, by weight of solution. Ideally, the oil is freely miscible with liquid caprylic acid.

An oil that can be separated from a solid in accordance with this invention can comprise natural or synthetic oils, fats, greases, or waxes, including those derived from animal, vegetable, or mineral sources; synthetic oils and greases containing hydrocarbon groups, such as organopolysiloxanes (silicones); and mixtures thereof. The oil typically comprises a substantially hydrocarbonaceous oil or grease, usually a natural or synthetic petroleum or petroleum product, such as crude oil, heating oil, bunker oil, kerosene, diesel fuel, aviation fuel, gasoline, naphtha, shale oil, coal oil, tar, lubricating oil, motor oil, solvents, waxes, and lubricating greases.

The solid phase from which an oil phase is separated in accordance with this invention is usually substantially insoluble in the carboxylic acid, e.g., caprylic acid, water, and dilute aqueous acids and alkalis under the conditions employed in the practice of this invention. The solid phase can comprise an article of manufacture, such as a metal part or glass plate which is being cleaned of oil and grease. More often, the solid phase comprises particulate solids. The solid phase can comprise insoluble organic materials, e.g., cellulosic materials such as bark, straw, or sawdust. Preferably, the solid phase comprises a major proportion of inorganic material, such as rocks, gravel, drill cuttings, sand, soil, or ash.

The oil phase can also comprise other dissolved or suspended constituents, including suspended solid constituents which remain part of the oil phase after separation from another solid phase. For example, oil-based drilling fluid typically comprises a base oil, additives such as surfactants and viscosity modifiers, and suspended particles of clay. The clay imparts body to the fluid so that the circulating fluid can entrain drill cuttings and carry them from the borehole. Drilling fluids also frequently contain a finely divided weighting material such as barite, a dense mineral that increases the density of the fluid for use in deep wells. Both the clay and the weighting material are typically so finely divided that they can remain suspended in the base oil for a substantial length of time. In the separation of drilling fluid from drill cuttings in accordance with this invention, the drilling fluid, including its suspended solid constituents, can constitute the "oil phase" and the drill cuttings can constitute the "solid phase."

Whether a given particulate solid can be separated from an oil phase in accordance with this invention is believed to depend in part upon the affinity of the oil for the solid, that is, upon the tendency of the oil to wet the solid, and also in part upon the particle sizes of the solid, larger particles being easier to separate. For example, the base oil in drilling fluid has a relatively strong affinity for the clay particles, whereas shale oil has a lesser affinity for the siliceous ash particles found in shale oil deasher sludge. The clay, e.g., bentonite, particles in drilling fluid are extremely fine, about 0.05 to 5 microns, averaging about 0.5 microns, whereas the ash particles in deasher sludge are on the order of 100 times larger, about 0.5 to 200 microns, averaging about 50 microns. In addition, clay particles are electrically charged and hence have a high affinity for oil, whereas siliceous particles are electrically neutral and hence have a lower affinity for oil. Thus, in one embodiment of this invention, clay particles in drilling fluid remain with the base oil when the fluid is separated from the drill cuttings, whereas in another embodiment, ash particles are separated from shale oil.

It is not possible to state in advance for all possible combinations of oils and particulate solids precisely which mixtures can be successfully separated in accordance with this invention. As a general rule, however, particles ranging in average size (greatest cross-sectional dimension) from about 50 microns and larger can be separated from hydrocarbonaceous oils, such as crude and refined petroleum oils and similar oils produced from oil shale, tar sands, coal, and the like, without difficulty by the methods of this invention. A simple laboratory-scale test such as that described in Example 3 will quickly show whether a given mixture can be separated in accordance with this invention.

Once the mixture of oil and solids to be separated has been treated with the carboxylic acid cleansing agent, the carboxylic acid is converted to the corresponding carboxylate by contacting the acid with a base, such as an alkali metal or ammonium hydroxide, carbonate, or bicarbonate. Alkali metal hydroxides are preferred. Usually, sodium hydroxide is most preferred because of its low cost.

However, potassium hydroxide is most preferred for use in separating oil-based drilling fluid from drill cuttings containing water-sensitive shale. Most wells of any appreciable depth pass through strata of water-sensitive shale, one reason oil-based drilling fluids are preferred for deep wells. In aqueous media-, such shale tends to crumble and disperse into very fine particles. If shale in drill cuttings is permitted to disperse in the aqueous washing solution used in the process of this invention, the resulting fine particles can be difficult or impossible to separate from the drilling fluid. Potassium ion in the aqueous washing solution tends to inhibit such dispersion of shale. For this purpose, it is desirable to maintain a potassium concentration, calculated as KCl, of at least about 1 weight percent, preferably at least about 2 percent, and more preferably at least about 4 percent, and even more preferably at least about 6 percent, in the aqueous washing solution. In the presently most preferred embodiment, the aqueous washing solution contains about 5 weight percent potassium chloride. Concentrations higher than about 10 percent can be used, but usually do not provide any significant advantage.

Whichever base is used, sufficient base is introduced to convert at least some, and usually at least a major proportion, of the carboxylic acid present in the treated mixture to the carboxylate salt. Preferably, sufficient base is introduced to convert substantially all of the carboxylic acid to the salt, i.e., one equivalent of base per equivalent of acid. The addition of base can be regulated by monitoring the pH of the aqueous washing solution during addition of the base. When the pH crosses above 7 and begins to climb, sufficient base has been added. Usually, when addition of base is complete, the aqueous solution has a pH of at least about 8, preferably between about 9 and about 12, which indicates that a slight excess of base has been added. The addition of any greater excess of base provides little or no benefit, but needlessly increases the consumption of the acid used subsequently to neutralize the aqueous solution and convert the carboxylate salt back to the carboxylic acid form.

The ratio of aqueous washing solution to separable oil phase in the mixture being separated is selected to provide a good balance of process conditions. If too little washing solution is used, separation of the oil phase from the solid may be incomplete, and the resulting emulsion of aqueous and oil phases may be tight and viscous, and thus hard to break or separate. If much more washing solution than necessary is used, larger equipment will be needed to handle the larger volume of liquid and costs will thus be increased. Usually, a sufficient ratio of washing solution to oil phase is used to produce a weak or unstable emulsion of oil phase in the washing solution that is physically manageable such that, when the emulsion breaks, the two phases can separate readily by gravity or be separated with the use of a simple liquid-liquid phase separator such as a hydroclone.

As mentioned above, it is preferable to use a stoichiometric amount of base plus a slight excess to neutralize the carboxylic acid in a given quantity of treated oil/solid mixture and convert it to the corresponding salt. Further, the volume of washing solution used to wash that quantity of oil/solid mixture is selected to provide a desirable balance between manageability of the resulting washing solution/oil phase mixture and the total volume of liquid to be handled. It follows that, when the base is included in the washing solution, rather than being introduced separately, the concentration of base in the washing solution is determined by the two factors just mentioned. In other words, the concentration of base in the washing solution, taken by itself, is not usually controlled independently.

When the mixture of oil-contaminated solids and carboxylic acid and/or carboxylate salt is contacted with the aqueous washing solution, it is desirable to provide sufficient agitation, i.e., sufficient shear, to assist-. in the removal of the oil phase from the solids. The need for agitation, and the degree of agitation or shear required, are related to the kind of oil/solid mixture being separated. When a light oil such as kerosene is separated from a siliceous solid such as sand, adequate separation can be achieved with little or no agitation of the carboxylic acid treated mixture in the aqueous wash. When heavier oils, such as heavy crude oil or oil-based drilling mud, are to be separated from irregular, clay-containing particles such as drill cuttings, sufficient agitation and shear are required to strip the oil from the solids by a combination of the mechanical action of the shear and the chemical, detergent-like action of the carboxylate salt. The oil is thus entrained in the aqueous wash and carried away from the solids. The aqueous wash with entrained oil can have the appearance of an unstable or weak oil-in-water emulsion, but typically the oil droplets coalesce spontaneously into a continuous oil phase when the mixture is allowed to rest or is passed through a phase separator such as a hydroclone.

In its broadest aspect, the process of the invention comprises the steps of: treating a system having an oil phase and a solid phase with a carboxylic acid cleansing agent that is soluble in the oil phase for dissolving cleansing agent in the oil phase; contacting the treated system, preferably with vigorous agitation, with an aqueous washing solution containing a reagent that converts the cleansing agent to a preferentially water-soluble, oil-insoluble form; and separating the washing solution and at least a portion of the oil phase from the solid phase. Thus, the present invention provides methods for separating organic liquids from solids.

Briefly, a method of the invention comprises the steps of dissolving a cleansing agent in an oil phase which is in contact with a solid phase; contacting said oil phase with an aqueous washing solution for separating at least a portion of said oil phase from said solid phase, said washing solution comprising a reagent which converts said cleansing agent from a preferentially oil-soluble form to a preferentially water-soluble form; and separating said washing solution and said portion of said oil phase from said solid phase.

The proportion of cleansing agent to use is not critical, in that almost any amount above a trace will provide some benefit.

Usually, the cleansing agent is a liquid comprising a carboxylic acid, preferably a liquid carboxylic acid, and, optionally, an auxiliary solvent for oils and greases. In general, a sufficient amount of the cleansing agent is applied to wet all of the contaminated surfaces to be cleaned. When a particulate solid is being cleaned, sufficient cleansing agent can be used to substantially fill the void volume in a mass of the particles; in other words, enough is used to cover the mass. Larger proportions of cleansing agent can be used, especially for heavily contaminated materials or materials contaminated with heavy oils, tars, or greases. Smaller proportions of cleansing agent can be used., particularly for lightly contaminated solids, if adequate mixing is provided to distribute the cleansing agent onto the contaminated surfaces.

Alternatively, the cleansing agent is used in a proportion such that the carboxylic acid present is equal to at least about 10 percent by volume of the oil and grease to be removed from the solids, preferably at least about 25 percent, more preferably at least about 50 percent, and even more preferably at least about 100 percent by volume.

Cleaning Drill Cuttings

In a preferred embodiment of the invention, drill cuttings from a well drilling operation using an oil-based drilling fluid, or mud, are cleaned of mud and oil sufficiently for environmentally safe disposal. The cleaned cuttings are essentially nontoxic and can be disposed of on land without the need for the special procedures required for disposal of toxic waste.

In many offshore drilling operations when an oil-based drilling mud has been used, environmental protection has made it necessary to accumulate the drill cuttings and transport them to shore for disposal in a toxic waste site. This can be a significant element of expense in the total cost of the well. Thus, in a highly preferred embodiment of the invention, drill cuttings from an offshore well are cleaned of drilling mud and oil in accordance with the invention and are returned to the sea near the offshore drilling platform. It is estimated that this procedure can result in a cost saving on the order of a million dollars for a typical North Sea oil well.

Regulatory standards vary. The United Kingdom has had a limit of 15 weight percent, and is proposing a limit of 10 percent, oil residue on cuttings (dry weight basis) discharged into the sea. Other countries, e.g., Norway and Holland, already have a limit of 10 weight percent, which is likely to be substantially reduced in the near future. The United States requires that cuttings discharged to the sea be "non-sheening," meaning that the cuttings do not leave an oily sheen on the surface of the water; this corresponds to a hydrocarbon residue on the cuttings of less than about 1 percent by weight of dry, oil-free cuttings.

The methods of this invention can remove at least about 75 weight percent of the oil mud clinging to drill cuttings, preferably at least about 90 percent, and most preferably at least about 95 percent. The pentane-extractable residual oil (hydrocarbon) on the cuttings can be reduced to less than about 5 percent by weight of dry, oil-free cuttings, preferably less than about 2 percent, and more preferably less than about 1 percent.

An example of a commercial-scale, continuous process for cleaning drill cuttings is described. Oily cuttings and liquid carboxylic acid, most preferably a 50:50 blend of caprylic and capric acids, are fed into a mixer, where the carboxylic acid dissolves, and dissolves in, the oil mud on the cuttings. The blend remains liquid at lower temperatures than either acid alone. The resulting slurry is fed to an extractor, where it is combined with an aqueous wash solution containing KOH and 5% KCl recycle from the regenerator (described below) to provide an overall KOH concentration of 4%. The KOH reacts with the carboxylic acid, converting it to its water-soluble potassium salt. Usually, sufficient alkali is used so that the aqueous phase has a final pH above 7, e.g., above about 7.5 or more, assuring substantially complete conversion of the carboxylic acid. The extractor provides sufficiently high shear to strip the oil mud and carboxylate salt from the cuttings, forming a suspension or weak, unstable emulsion of oil mud globules in the aqueous wash solution. At the same time, the carboxylate salt, which is preferentially water-soluble, passes into the aqueous phase.

The slurry, now containing the drill cuttings in a suspension or unstable emulsion of oil mud in wash solution, is then transferred to a vibrating screen, where the liquid phase (oil mud and wash solution) drains off. Water is sprayed on the cuttings from above to further rinse the oil mud and wash solution from the cuttings through the screen. From the screen, the cuttings are moved by a screw conveyor to a collection point for return to the sea or shipment for onshore disposal. Alternatively, the final rinse water can be sprayed on the cuttings as they move through the screw conveyor. The cleaned cuttings can then be disposed of by the same methods used for cuttings from wells drilled with the use of water-based drilling fluid, e.g., returning cuttings to the sea or burying them in pits on land.

The underflow is pumped to a separator, where the oil mud globules settle to the bottom because of their high density, which is attributable to the weighting material and clay contained in the mud. Preferably, the separator is a hydroclone, which provides faster and more complete separation than gravity alone. The oil mud globules coalesce into a continuous oil mud phase, which to offset the cost of building new mud.

The supernatant aqueous phase containing dissolved potassium carboxylate salt is transferred to a regenerator, where HCl is added to regenerate the carboxylic acid. The carboxylic acid, being insoluble or only slightly soluble in water, separates out as an organic phase on top of the aqueous phase and is recycled to the mixer to be combined with incoming contaminated drill cuttings.

The aqueous phase from the regenerator, now containing 5 percent KCl as a result of the reaction between the HCl and the potassium carboxylate salt, is recycled back to the extractor as part of the aqueous wash solution.

Large amounts of lime ($Ca(OH)_2$) in the mud system, i.e., more than about 2 pounds per barrel, are best avoided, because excess lime will cause a high pH and react with the carboxylic acid, thickening the mud. This is not a problem, however, because oil-based muds do not usually require large proportions of lime (a source of free $Ca++$ ion needed to activate some emulsifiers). $CaCl_2$, which is normally included in oil muds, will often provide a sufficient source of $Ca++$ ion. Alternatively, emulsifiers can be used which do not require lime to be activated.

The properties of oil mud recovered from cuttings in accordance with this invention are not significantly adversely affected. The recovered mud can be returned to the active mud system without danger to the properties thereof.

Environmental Cleanup

The present invention is especially useful for cleaning rock, gravel, sand, and soil that is contaminated with crude oil, grease, and/or petroleum products such as gasoline, diesel fuel, and fuel oil as a result of oil spills, pipeline breaks, leaking fuel tanks, industrial operations, and the like. In an embodiment of the invention, contaminated material is excavated, passed through the cleaning process, and returned to the site of origin. If the highest degree of cleaning is desired, material first cleaned in accordance with this invention is in excellent condition to be treated by one of the known biological methods for final purification. The present invention can quickly remove most of the contaminating oil, grease, or fuel, and leaves only a small residue of the cleansing agent, which is itself readily biodegradable and can promote the growth of the microtaminants.

In another embodiment of the invention, the cleansing agent is applied to a contaminated surface, such as rock, a seawall, pavement, and the like. The treated area is then washed with the aqueous washing solution for removal of the contaminating grease or oil. Preferably, the used washing solution is captured so that the oil or grease and the cleansing agent can be recovered for reuse or safe disposal.

Treatment of Shale Oil Deasher Sludge

Oil shale is a sedimentary rock containing solid organic matter called kerogen. By a variety of techniques, oil shale is fragmented and retorted to break down the kerogen into gaseous and liquid hydrocarbonaceous products, including shale oil. The shale oil thus produced contains a substantial proportion of ash, i.e., finely divided, predominantly siliceous, particulate matter. The ash must be removed to render the shale oil fit for further processing.

One method for removing ash from shale oil involves washing the oil with water. After a series of steps such as de-emulsification and centrifuging, the solids become concentrated in a sludge containing free water and an emulsion of shale oil, solids, and water. A representative sample of such a sludge contains, after decanting any free water phase, about 50 percent water, 30 percent oil, and 20 percent solids. Because of its oil content, the sludge must be handled as a toxic waste requiring special disposal techniques. In addition, recovery of the oil trapped in the sludge can result in several million dollars per year of additional oil production from a single commercial oil shale retort.

In accordance with this invention, shale oil deasher sludge can be treated so as to recover a high percentage, e.g., at least about 90 percent, preferably at least about 95 percent, and more preferably at least about 99 percent of the shale oil, leaving the solids substantially non-toxic for safe disposal without special precautions. Example 3 illustrates the treatment of shale oil deasher sludge in accordance with this invention.

In another embodiment, sufficient liquid carboxylic acid is mixed with the sludge to reduce the viscosity thereof, so that the ash particles can settle out by gravity or in a continuous centrifuge, for example. The shale oil, now free of ash, can be treated with an alkali wash, preferably low-cost aqueous NaOH, for extraction of the carboxylic acid as the sodium carboxylate salt. The concentrated ash can then be treated separately with the aqueous alkali wash, preferably with vigorous agitation, for removal of the residual shale oil/carboxylic acid mixture present in the ash. The used wash solutions, which contain sodium carboxylate, can be combined in a regenerator and treated with HCl for regeneration of the carboxylic acid.

Other finely-divided, oil-contaminated solids can be treated in this way, such as refinery sludges, soils from refinery and industrial sites, soils from the site of leaking fuel storage tanks, and the like.

The following examples are intended to illustrate particular embodiments of the invention. The examples are not intended in any way to limit the invention, the scope of which is defined in the appended claims.

EXAMPLE

Four cuttings cleaning processes were compared in laboratory-scale tests: carboxylic acid method, base oil dilution (with Conoco LVT oil), ether-alcohol wash, and surfactant wash. The cuttings were obtained from an offshore well near Texas. Milpark Carbo-Drill diesel oil-based mud with an oil-water ratio of 80:20 was used on this well. The composition of the mud is given in Table 1 along with the toxicity of No. 2 diesel. The formation which was drilled consisted primarily of gumbo shale. This highly reactive shale contains mostly clay. Generic descriptions of the chemicals used in the cleaning tests are provided in Table 2.

TABLE 1

COMPOSITION OF OIL-BASED DRILLING MUD AND TOXICITY OF DIESEL OIL

| 15 LB/GAL OIL-BASED DRILLING MUD | |
|---|---|
| Component | Quantity |
| No. 2 Diesel Oil | .615 bbls |
| Carbo-Mul (Primary Emulsifier) | 5.8 lbs/bbl |
| Carbo-Tec L (Secondary Emulsifier) | 5.0 lbs/bbl |
| 25% CaCl$_2$ Brine | .109 bbls |
| Barite (Weighting Material) | 405.0 lbs/bbl |
| Carbo-Gel (Organophilic Clay) | 2 2.0 lbs/bbl |
| Lime (Ca(OH)$_2$) | 2.0 lbs/bbl |
| Carbo-Trol A-9 (Fluid Loss Control Agent) | 2.0 lbs/bbl |

| TOXICITY OF NO. 2 DIESEL | | |
|---|---|---|
| Toxicity: | Mysid Shrimp 96 hr. LC$_{50}$, % SPP* | <1 |

*Percentage of SPP (suspended particulate phase prepared by shaking a 1:9 mixture of drilling fluid base oil and sea water) required to kill 50% of Mysidopsis bahia organisms after 96 hours (EPA standard). A low LC$_{50}$ values implies high toxicity.

TABLE 2

GENERAL DESCRIPTIONS OF CUTTINGS WASHING CHEMICALS

| | Generic Description |
|---|---|
| 1. Carboxylic Acid | Octanoic acid or caprylic acid (a C$_8$ carboxylic acid derived from vegetable oil). |
| 2. LVT Oil (Conoco) | A petroleum base oil with a distillation range of 367–505° F., 14% aromatics and a low toxicity relative to diesel. |
| 3. Ether-Alcohol | Methoxytriglycol. |
| 4. Anionic Surfactant (Dowfax 2A1) | Sodium dodecyldiphenyl oxide disulfonate (45% active) |

The following procedure was used in the cleaning method of this invention:

1. 20 gms of mud-contaminated cuttings were placed in a 100 cc graduated cylinder;
2. 5 mls of caprylic acid were added to the cuttings;
3. The sample was shaken for 3 minutes;
4. 30 mls of 2.5% KOH + 6% KCl were added (resulting pH = 13);
5. The sample was shaken for 3 minutes;
6. The resulting slurry was poured over a 400 mesh screen (0.0015 inch opening) with vacuum on (a 140 mesh screen with 0.0041 inch opening was used in a repeat test);
7. The cuttings on the screen were rinsed with 30 mls of 2.5% KOH + 6% KCl; and
8. The oil mud and caprylic acid were regenerated by adding 12 mls of 6N HCl to the wash solution (resulting pH = 5).

Similar procedures were used for the LVT base oil dilution, ether-alcohol wash, and surfactant wash tests. The primary difference in these tests was that pH adjustment with KOH and HCl was not used.

After each test, the hydrocarbon extraction efficiency was determined using pentane (see Table 3 for an example calculation).

TABLE 3

EXAMPLE CALCULATION OF EXTRACTION EFFICIENCY
(Test #3, Ether-Alcohol)

1. Test sample consists of gumbo shale drill cuttings coated with oil mud. These cuttings were obtained from an offshore well near Texas. A 20.2 gm test sample contains, on average, 17.5 gms of gumbo shale cuttings coated with 2.6 gms of oil mud, as determined on a representative sample by pentane extraction.
2. Weight of 20.2 gm test sample after extraction with ether-alcohol = 19.3 grams.
3. Weight of material extracted by ether-alcohol = 20.2 − 19.3 = 0.9 gms.
4. Weight of sample after pentane extraction (to determine residual oil mud on cuttings after ether-alcohol extraction) = 17.4 gms.
5. Weight of additional material extracted by pentane = 19.3 − 17.4 = 1.9 gms.
6. Total weight of material removed by ether-alcohol followed by pentane extraction = 0.9 + 1.9 = 2.8 gms.
7. Extraction efficiency using ether-alcohol* =

$$\frac{9}{2.8} \times 100\% = 32\%.$$

*Note: The test specimen apparently contained 2.8 gms of extractable material as compared with 2.6 gms on the representative sample mentioned above. The difference was probably due to dispersed gumbo shale passing through the 400 mesh screen in test #3.

The extraction efficiencies from the cuttings washing tests are shown in Table 4.

TABLE 4
RESULTS OF CUTTINGS WASHING TESTS

| PROCESS | WT. % OIL MUD EXTRACTED* (of original oil mud on cuttings) | EXTRACTED OIL MUD RECOVERABLE? |
|---|---|---|
| 1. FATTY ACID 6% KCl, 2.5% KOH | 92.3 (400 mesh screen) | YES |
|  | 98.0 (140 mesh screen) | YES |
| 2. LVT OIL, 6% KCl | 50.0 (400 mesh screen) | YES |
| 3. ETHER-ALCOHOL, WATER | 32.0 (400 mesh screen) | YES |
| 4. ANIONIC SURFACTANT, 6% KCl | 68.0 (400 mesh screen) | NO |

*Oil mud-contaminated cuttings originally contained 13 wt. % oil mud as determined by pentane extraction.

The carboxylic acid method extracted much more oil mud from the cuttings (92-98 wt. %) than any of the other three methods (50 wt. % for the LVT oil dilution, 32 wt. % for the ether-alcohol wash and 68 wt. % for the surfactant wash). The extraction efficiency obtained in the carboxylic acid test was slightly greater using a 140 mesh 98.0 wt. %) than a 400 mesh screen (92.3 wt. %), possibly due to dispersed shale passing through the 140 mesh screen or oil mud being retained on the 400 mesh screen. The extracted oil mud and caprylic acid were recovered by adding 12 ml of 6N HCl to the filtrate (spent wash solution). After the extraction, the cuttings were observed to be clean and free of oil mud. They exhibited a slight odor of carboxylic acid but no diesel oil odor. The 2-8% "unextracted" residue was probably not oil mud but instead carboxylic acid salt left over from the washing step.

The poor extraction efficiency with LVT oil (50 wt. %) in the second test was due to failure of the LVT oil to completely wash off the cuttings. This was confirmed by noting an oily odor on the washed cuttings. Neither ether-alcohol nor anionic surfactant penetrated very far into the oil mud on the cuttings, hence the poor extraction efficiencies (32% and 68%, respectively). Observation of the cuttings after these tests indicated that a significant amount of oil mud remained on the cuttings. After the anionic surfactant wash, the oil mud could not be recovered in the filtrate because it was tightly emulsified.

EXAMPLE 2

The four solids cleaning processes described in were carried out on 20x40 mesh silica sand contaminated with about 10 wt. % kerosene. The kerosene contained a green oil-soluble dye for visual identification of residual kerosene on the sand.

The following procedure was used in the carboxylic acid method:

1) 18 gms of sand contaminated with 2 gms of kerosene were placed in a 100 cc jar;
2) 5 mls of caprylic acid were added to the sand
3) the sample was shaken for 3 minutes;
4) 30 mls of 2.5% KOH were added (resulting pH=13)
5) the sample was shaken for 3 minutes;
6) the resulting slurry was poured over a 140 mesh screen (0.0041 inch opening);
7) the sand on the screen was rinsed with 40 mls of 2.5% KOH;
8) the kerosene and caprylic acid were regenerated by adding 12 mls of 6N HCl to the wash solution (resulting pH=5).

Similar procedures were used for the LVT oil primary difference in these tests was that pH adjustment with KOH and HCl was not used.

After each test, the hydrocarbon extraction efficiency was determined using pentane. The extraction efficiencies from the sand washing tests are shown in Table 5.

TABLE 5
RESULTS OF SAND WASHING TESTS
(20 × 40 mesh sand coated with 10 wt. % kerosene)

| Process | Wt. % Kerosene Extracted (of original kerosene on sand) | Extracted Kerosene 100% Recoverable? |
|---|---|---|
| 1. Carboxylic Acid, 2.5% KOH | 100 | Yes |
| 2. LVT Oil, Water | 85 | Yes |
| 3. Ether-Alcohol, Water | 57 | No |
| 4. Anionic Surfactant, Water | 95 | No |

The method of this invention extracted more kerosene from the sand (100 wt. %) than any of the other three methods (85 wt. % for the LVT oil dilution, 57 wt. % for the ether-alcohol wash, and 95 wt. % for the surfactant wash). After extraction by the process of this invention, the sand was observed to be clean and free of kerosene odor and green color from oil-soluble dye. The extracted kerosene was decanted from the aqueous phase. Then, the caprylic acid was recovered by adding 12 ml of 6N HCl to the remaining filtrate (spent wash solution).

The LVT oil did not completely wash off the sand. This was confirmed by noting an oily odor and a green color on the sand from the oil-soluble dye. The kerosene and LVT oil in the spent wash solution completely separated from the aqueous phase.

In the third test, the ether-alcohol did not sufficiently penetrate the oil nor did it completely wash off the sand. The inability to wash off the sand is undesirable because of the high toxicity of ether-alcohol. Most of the kerosene in the spent wash solution was recoverable. However, some cross-contamination of kerosene and ether-alcohol occurred.

The extraction efficiency with anionic surfactant in the fourth test was high (95 wt. %), however, the kerosene was not recoverable in the spent wash solution because of emulsification.

EXAMPLE 3

Two shale oil deasher sludge cleaning processes were compared in laboratory-scale tests: the method of the present invention and naphtha addition.

The following procedure was used to treat shale deasher sludge with carboxylic acid:

1) 3.5 gms sludge was mixed with 3.5 gms carboxylic acid;
2) the sample was stirred for 5 minutes;
3) the sludge and carboxylic acid were poured into a buchner funnel (7 cm i.d.) containing Whatman No. 1 filter paper. A 100-ml filter flask connected to vacuum was placed beneath the funnel to collect filtrate;
4) after filtering for 5 minutes, 35 mls 2.5% NaOH was used to rinse the filter cake;

5) shale oil was decanted from the surface of the filtrate;
6) concentrated (6N) HCl was added to the filtrate to regenerate carboxylic acid. The carboxylic acid was decanted from the surface of the filtrate;
7) the filter cake was weighed to determine recovery efficiency;
8) the test was repeated using a 2:1 ratio of carboxylic acid to deasher sludge (7 gms of carboxylic acid and 70 mls 2.5% NaOH).

The following procedure was used to treat shale deasher sludge with naphtha:
1) 3.5 gms sludge was mixed with 3.5 gms naphtha;
2) the sample was stirred for 5 minutes;
3) the sludge and naphtha were poured into a buchner funnel (7 cm i.d.) containing Whatman No. 1 filter paper. A 250-ml filter flask connected to vacuum was placed beneath the funnel to collect filtrate;
4) After filtering for 5 minutes, the filter cake was weighed to determine recovery efficiency;
5) the test was repeated using a 2:1 ratio of naphtha to deasher sludge (7 gms naphtha).

The shale oil recovery efficiencies obtained in the laboratory tests are shown in Table 6. The carboxylic acid process extracted significantly more shale oil (97.2 wt. %) than the naphtha addition (62.5 wt. %) when a 1:1 ratio of treating agent to deasher sludge was used. When a 2:1 ratio was used, the carboxylic acid also exhibited higher extraction efficiency than naphtha addition (99.6 wt. % versus 74.4 wt. %). In a commercial process, a 2:1 ratio would be preferred because half the materials could be used with about the same results.

be separated without using an expensive distillation step (which requires a large quantity of heat).

After the carboxylic acid extraction, the solids were observed to be clean and free of shale oil. The 0.4–2.8% "unextracted" residue was probably mostly carboxylic acid salt left behind during the washing step. From an environmental standpoint, it is much more desirable to leave behind a residue of vegetable-based carboxylic acid than toxic naphtha (containing 12–13% benzene) and raw shale oil.

While particular embodiments of the invention have been described and illustrated herein, it will be understood that the invention is not limited thereto, since many obvious modifications can be made. This invention is intended to include any such modifications as will fall within the scope and equivalency of the appended claims.

What is claimed is:

1. A method for cleaning oil-contaminated particulate solids, which comprises:
    contacting contaminated solids with a non-aqueous liquid composition comprising a carboxylic acid;
    then contacting the solids with an aqueous wash containing a reagent for converting said carboxylic acid to a water-soluble carboxylate salt; and
    removing an aqueous phase containing carboxylate salt and entrained oil.

2. A method for cleaning drill cuttings contaminated with oil-based drilling mud in a well drilling operation, which comprises:
    (a) contacting cuttings with a non-aqueous, liquid composition comprising a carboxylic acid, the composition having substantial solvency for oils TABLE 6
RESULTS OF SHALE DEASHER SLUDGE CLEANING EXPERIMENTS
USING FATTY ACID AND NAPHTHA TREATING AGENTS

| Treating Agent | Wt. Untreated Sludge, gms | Wt. Sludge After Treatment, gms | % Recovery of Shale Oil & Water* | Is Shale Oil In Spent Wash Solution Recoverable? |
|---|---|---|---|---|
| *1:1 Treating Agent:Sludge Ratio* | | | | |
| Carboxylic Acid | 3.5 | .73 | $\frac{3.5 - .73}{2.85^{**}} \times 100 = 97.2\%$ | Yes, immediately |
| Naphtha | 3.5 | 1.72 | $\frac{3.5 - 1.72}{2.85} \times 100 = 62.5\%$ | Yes, after distillation |
| *2:1 Treating Agent:Sludge Ratio* | | | | |
| Carboxylic Acid | 3.5 | .66 | $\frac{3.5 - .66}{2.85^{**}} \times 100 = 99.6\%$ | Yes, immediately |
| Naphtha | 3.5 | 1.38 | $\frac{3.5 - 1.38}{2.85} \times 100 = 74.4\%$ | Yes, after distillation |

*pentane-extractable
**weight of shale oil and water as determined previously by pentane extraction on a representative sample of deasher sludge In the naphtha addition tests, it was not possible to distinguish between unextracted shale oil and naphtha which was left behind on the solids (filter cake). Undoubtedly, a significant part of the "unextracted shale oil" was actually naphtha. Since naphtha is a higher value product than raw shale oil, this is detrimental to the economics of the process.

All of the extracted shale oil was recovered from the spent wash solution in the carboxylic acid test. After decanting the shale oil, 6N HCl was added to lower the pH, return the carboxylic acid to its oil-soluble form, and recover it by decanting. In the naphtha test, the shale oil and naphtha in the spent was solution could not and the cuttings being contaminated with oil-based drilling mud comprising suspended, particulate solids selected from the group consisting of clays and weighting materials;
(b) washing the cuttings with an aqueous wash comprising a base for converting the carboxylic acid to a water-soluble carboxylate salt;
(c) separating from washed cuttings an aqueous phase containing dissolved carboxylate salt and entrained drilling mud comprising said suspended, particulate solids; and
(d) separating from the aqueous phase drilling mud still comprising said suspended, particulate solids.

3. The method of claim 2 further comprising the step of adding an acid to the aqueous phase for regenerating the carboxylic acid.

4. The method of claim 3 further comprising the step of reusing separated drilling mud in the drilling operation, the separated drilling mud comprising said suspended, particulate solids.

5. The method of claim 3 wherein the regenerated carboxylic acid is recovered and returned to said contacting step.

6. The method of claim 2 wherein the carboxylic acid has a substantially hydrophobic end portion and a substantially hydrophilic carboxylic acid end portion.

7. The method of claim 6 wherein the carboxylic acid is in the form

$$R-(COOH)_n$$

wherein R is an organic radical having between about 4 and about 40 carbon atoms, and n is at least 1.

8. The method of claim 6 wherein R has between about 6 and about 20 carbon atoms and n is 1.

9. The method of claim 6 wherein the carboxylic acid comprises an aliphatic monocarboxylic acid.

10. The method of claim 6 wherein the carboxylic acid comprises an unsubstituted alkyl monocarboxylic acid.

11. The method of claim 6 wherein the carboxylic acid comprises a blend of at least two carboxylic acids.

12. The method of claim 11 wherein the blend of carboxylic acids constitutes at least about 80 volume percent of the liquid composition.

13. The method of claim 2 wherein at least about 50 weight percent of said drilling mud is removed.

14. The method of claim 2 wherein at least about 75 weight percent of said drilling mud is removed.

15. The method of claim 2 wherein at least about 90 weight percent of said drilling mud is removed.

16. The method of claim 2 wherein at least about 95 weight percent of said drilling mud is removed.

17. The method of claim 2 wherein the carboxylic acid is liquid.

18. The method of claim 2 wherein the carboxylic acid is selected from the group consisting of acetic acid, propionic acid, butyric acid, isobutyric acid, valeric acid, isovaleric acid, caproic acid, n-heptanoic acid, caprylic acid (i.e., n-octanoic acid), pelargonic acid, capric acid, palmitic acid, stearic acid, arachidic acid, n-heptadecanoic acid, oleic acid, linoleic acid, linolenic acid, arachidonic acid, undecylenic acid, lauric acid, myristic acid, behenic acid, benzoic acid, salicylic acid, bismethylene salicylic acid, cinnamic acid, pamoic acid, ortho-phthalic acid, and mixtures thereof.

19. The method of claim 2 wherein the carboxylic acid comprises a mixture of caprylic acid and capric acid.

20. The method of claim 2 wherein the drilling mud separated from the aqueous phase comprises substantially all of the suspended, particulate solids present in step (a) of claim 2.

21. The method of claim 2 wherein the drilling mud separated from the aqueous phase is substantially free of carboxylic acid.

* * * * *

UNITED STATES PATENT AND TRADEMARK OFFICE
CERTIFICATE OF CORRECTION

PATENT NO.   :   5,156,686
DATED        :   October 20, 1992
INVENTOR(S)  :   Donald C. Van Slyke It is certified that error appears in the above-identified patent and that said Letters Patent is hereby corrected as shown below:

```
Claim 1, column 16, line 21, after "contacting" insert
-- the --.

Claim 1, column 16, line 26, after "containing" insert
-- the --.

Claim 2, column 16, line 31, after "contacting" insert
-- the --.

Claim 2, column 16, line 63, after "from" insert
-- the --.

Claim 2, column 16, line 67, after "phase" insert
-- the --.

Claim 4, column 17, line 5, after "reusing" insert
-- the --.
```

Signed and Sealed this

Fifth Day of October, 1993

Attest:

BRUCE LEHMAN

*Attesting Officer*        *Commissioner of Patents and Trademarks*